May 11, 1965
J. ROSENBERG ETAL
3,182,383
ELECTROMAGNETIC CONSTRUCTION
Filed Sept. 13, 1960
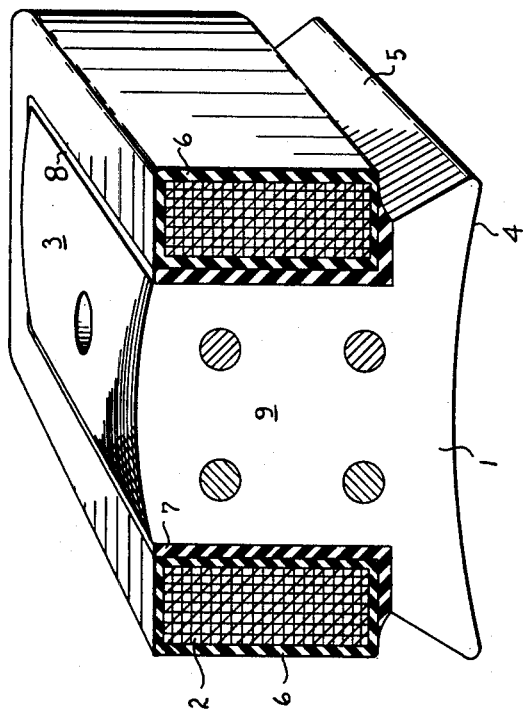
INVENTORS
JOSEPH ROSENBERG
WALTER N. LARSEN
BY Robert H Montgomery
ATTORNEY

United States Patent Office 3,182,383
Patented May 11, 1965

3,182,383
ELECTROMAGNETIC CONSTRUCTION
Joseph Rosenberg, Framingham, Mass., and Walter N. Larsen, Erie, Pa., assignors to General Electric Company, a corporation of New York
Filed Sept. 13, 1960, Ser. No. 55,623
4 Claims. (Cl. 29—155.57)

This invention relates to an electromagnetic apparatus and more particularly to an electric coil and pole assembly and the method of making the same. The invention has special application to salient pole dynamoelectric machines.

In a dynamoelectric machine, one or more of the members may have salient poles of magnetic material thereon with electric coils thereabout whereby magnetic flux is induced in the pole piece when an electric current is caused to flow in the coil. The coil is composed of a plurality of turns of wire having an electrically insulating enamel or wrapping thereon to electrically insulate the adjacent turns and layers of wire. Such wire is generally referred to as magnet wire.

The design of a coil and pole construction demands several important considerations, among which are adequate coil ground insulation, structural support of the coil on the pole, and the transfer of heat from the coil to the ground insulation and from the ground insulation to the pole. It is apparent that the current passing through the coils will generate heat in the coil which must be conducted to the surface of the coil for convection cooling and to the pole piece which acts as a heat sink for the heat generated in the coil, and which serves to dissipate the heat to the frame from which it passes to the air. Thus, the heat transfer capabilities of the insulation and of the coil construction are extremely important in dissipating heat generated in the coil. It is therefore apparent that although the magnet wire enamel is electrically insulating, it should be a good heat conductor to transfer heat generated within the coil to the surface of the coil, and the insulation must be able to withstand the operating temperatures of the coil without deterioration.

It is quite well known that the output ratings of motors and generators can be increased by increasing the field strength by increasing field current. However, increasing field current increases the insulating problem in that the increased operating temperature tends to cause the magnet wire enamel to deteriorate, and thus decrease the dielectric strength thereof. However, to utilize higher current densities in magnet wire and to provide the necessary insulation system therefor, so-called "Class B" insulation has been devised. Class B insulation may be defined as that insulation which will withstand continuous operation at 130° C. and above, and also as an insulation system that will withstand a 90° C. operating temperature rise above ambient.

Until recently, Class B magnet wire insulation was mostly inorganic in nature and comprised an inorganic fibrous material such as asbestos or glass fiber with a binder holding such fibers on or in the magnet wire enamel. These fibers are commonly referred to as "serving." These fibers increased the spacing between the adjacent coil turns to provide necessary dielectric strength therebetween, but in doing so provided air spaces between the turns which are detrimental to good heat transfer. A widely practiced prior art technique in making Class B insulated coils is to form wind the coil with glass served magnet wire, tape the coil with mica mat tape to provide insulation thereabout, and wind again with a glass or glass-impregnated tape, dip the taped coil in a polyester resin which is then cured to provide a shell of ground insulation about the coil. This process often included in some form an impregnation step to fill the spaces between conductors to avoid air pockets which detract from the heat transfer characteristics of the coil. The impregnation step required in most cases is dipping the coil in a resinous liquid containing a solvent, followed by a vacuum or pressure treatment to force the impregnating material, usually a varnish or resin, into the interstices of the coil and, then curing of the impregnating material. However, the vacuum or pressure treatment did not always leave the coil void-free due to the presence of the solvent in the impregnating material and the evaporation of the solvent during the curing treatment.

A recently developed magnet wire having enamel thereon suitable for Class B and better operation has eliminated the need of glass serving to provide sufficient dielectric strength between coil turns for Class B operation. This magnet wire is described and claimed in U.S. Patent 2,936,296, assigned to the same assignee as this application. However, a coil formed of this magnet wire inherently has voids or air spaces therein between conductors which are detrimental to transfer of heat from the interstices of the coil to the surface.

Coils constructed in the conventional manner described above have found wide use and were acceptable to the industry. However, the use of any tape about the coil requires considerable hand labor and further establishes a barrier to transfer of heat from within the coil to the insulating shell surrounding the coil. Additionally, the tape cannot always be of uniform thickness about the coil, and thus may prevent intimate contact between the entire area of the facing surfaces of the coil and pole and thus reduce heat transfer therebetween.

For ease of manufacture and to avoid the use of glass tape, it has been proposed to pressure mold a resin glass laminate about a formed coil. However, the large amount of glass fibers used in this technique to increase the structural strength of the ground insulation about the coil detracts from the heat transfer capabilities of the molded ground insulation due to entrapment of air within the strands forming the fibers. In this respect the actual thickness of the coil ground insulation is not so critical so long as structural and dielectric strength are adequate, as is the heat transfer properties of the ground insulation.

No matter how good the heat-dissipating qualities of the insulated coil itself, it is still necessary to transfer an extremely large portion of the heat generated in the coil to the heat sink, i.e., the pole piece, and thence the magnet frame. In conventional pole construction, it has been the practice to use metal clips to wedge the coil to the pole by inserting the metal clips between the coil and pole at their longer dimensions. This provides only a relatively small cross-sectional heat-conducting path compared to the facing areas of the coil and pole piece.

To provide a larger heat-conducting path from coil to pole, coils have first been covered in an electrically insulating shell to provide ground insulation, and then cast to the pole; or an insulating coating has been cured on the pole, wrapped with glass tape and had the coil wound directly on the pole, after which the coil was impregnated and then the entire assembly dipped in an encapsulating compound to form an electrically insulating shell, which covered the coil and bonded it to the pole. When a coil was cast to the pole, a pressure or vacuum treatment was necessary to provide a void-free bond between coil ground insulation and pole, and additionally mechanical locking devices were used to compensate for variations in coefficients of expansion between the coil and pole. The second mentioned bonding method included the undesirable glass wrapping between coil and pole which decreased heat transfer to the pole and further was undesirable from a manufacturing standpoint in that the coil must be wound on the pole, necessitating in the case of large poles a larger winding machine to support and turn the pole. Furthermore, at least two dipping steps were required.

In view of the limitations in methods of manufacturing prior art electromagnetic members, particularly the number of coil impregnating and dipping steps, as well as the laborious taping and the relatively inefficient heat transfer characteristics thereof attained, we have provided a pole and coil construction which is easily manufactured and which has improved heat dissipation capabilities.

Therefore, among the objects of our invention are the provisions of: a coil assembly having increased heat transfer capabilities which allows reduction of coil size or an increase in output; an improved method of manufacturing insulated electric coils and electromagnetic assemblies; a more efficient and economical process of manufacturing magnet coils and process of joining the coil to the core; reduction of hand labor in manufacturing the assembly by the elimination of all taping procedures; and provision of a new and improved Class B insulation system.

Other objects and advantages of the invention will be pointed out or become apparent as the preferred manner of practicing the invention is disclosed for use in the environment mentioned.

Briefly stated, in practicing this invention in one form thereof, we form a self-supporting, essentially void-free coil of enamel coated magnet wire to predetermined dimensions, provide an encapsulating insulating shell of resinous composition having good thermal conductivity and electrical insulating characteristics directly over the formed coil of essentially uniform thickness, effect at least a partial cure of the encapsulating composition, place the coil about a magnetic core shaped for use as a salient pole in a dynamoelectric machine, fill the space between the encapsulated coil and core with a solventless bonding composition of good heat-conducting properties, and then effect a complete cure of both compositions to form a rigid unitary pole and coil structure.

The features of the invention which we believe to be novel are pointed out with particularity in the claims appended to and forming a part of this specification. The invention itself, together with further objects and advantages thereof, may best be understood by referring to the following description of the preferred method of practicing the invention.

The single figure of the drawings illustrates a magnetic core member 9 of generally rectangular shape in the form of a salient pole 1 formed of magnetic steel laminations with a coil 2 thereon formed of enameled magnet wire. The coil is formed with a window 8 of greater dimensions than the core 9 to allow positioning of the coil 2 about the core 9. The pole 1 is adapted to have surface 3 secured to the magnet frame of a dynamoelectric machine, not shown. The under surface 4 of pole shoe 5 defines with a rotor, not shown, an air gap.

In preparing the member shown in the drawing, the coil 2 is first formed by winding the magnet wire to predetermined dimensions selected in accordance with the dimensions of the magnetic core 9 upon which the coil 2 is to be mounted. The diameter and number of turns in the coil will, of course, be governed by design considerations of the machine in which the member is to be used.

In forming the coil, we prefer to use a magnet wire having an enamel of good heat resistance, along with the other desirable physical properties of abrasion, crack and craze resistance, and flexibility, suitable for at least a Class B insulation system. Such magnet wire is available and is marketed under the trademark "Alkanex" by the General Electric Company and has an enamel thereon of a polyester resin described in the aforementioned U.S. Patent 2,936,296, assigned to the same assignee as this application.

The magnet wire is preferably wound on a form from a spool and may either be precision, layer or random wound. In order to provide a self-supporting coil which may be removed from the winding form and to fill the voids between coil sides to therefore obviate impregnation and taping procedures, as an aspect of the invention we apply in sufficient quantity a flowable adhesive or bonding material to the magnet wire as the wire is fed to the form by passing the wire through the adhesive, or alternatively, over a roller or between rollers coated or impregnated with the adhesive.

As used herein, a "flowable" material is one which is either a liquid or semi-liquid, or one which is partially cured such that it will soften so as to flow to some extent during the process of completely curing the material.

When Alkanex magnet wire is used to form the coil, we prefer to use a compatible adhesive comprising a solventless epoxy resin, —$BF_3$ amine complex material. Such an adhesive is disclosed in the co-pending application of Joseph Rosenberg, Serial No. 735,562, filed May 15, 1958 and assigned to the same assignee as this application. The disclosure of this co-pending application is incorporated herein by reference.

For immediate reference, the composition of this flowable adhesive or bonding material comprises an epoxy resin with a boron trifluoride-organic base curing agent. United States Patents 2,324,483 and 2,444,333 describe resins which are the reaction product of epichlorohydrin such as epichlorohydrin and a phenol, having at least two phenolic hydroxy groups such as bis-(4-hydroxy phenyl)-2,2-propane, and the ethoxyline resins described in United States Patents 2,494,295, 2,500,600 and 2,511,913, and having more than one epoxy group per molecule may be used in the adhesive. The epoxy or ethoxyline resins may be prepared by reacting a polyhydroxy alcohol or phenol such hydroquinone, resorcinol, glycerine and condensation products of phenols with ketones, for example, bis-(4-hydroxy phenyl)-2,2-propane with epichlorohydrin. Such ethoxyline resins are sold under the name of Epon, by Shell Chemical Corporation; under the name Araldite, by the Ciba Company; as Epi-Rez resins, by Devoe-Reynolds Company; and ERL resins by the Bakelite Company. The boron trifluoride-organic base complex materials used are well known in the art. They are conveniently prepared by adding to an ether solution of base amine, as desired, an ether solution of a boron trifluoride-ether complex. They can also be prepared by simply bubbling boron trifluoride gas through an ether solution of a base. Preferably alkyl ethers are used such as methyl, ethyl, propyl, butyl, etc., or mixed alkyl esters as well as aryl esters, ethers, alkaryl and aralkyl ethers. Among the amines which can be used are methyl amine, ethyl amine, propyl amine, butyl amine, aniline, diethyl aniline, toluidines, chloroaniline, nitroaniline, and piperidine. Also useful are complexes prepared as above of boron trifluoride with materials such as phenol and etherate complexes alone as used in conjunction with the lactams. A $BF_3$-ethylamine complex material is commercially available from the General Chemical Division of the Allied Chemical Corporation and is known as $BF_3$-400. The preferred proportion of resin to curing agent is 100:3 by weight, and this adhesive has a viscosity of approximately 40,000 centipoises at 25° C.

After the coil is formed the flowable adhesive therein is cured. If oven-cured, the temperature may range from 150° C. to about 225° C. for times varying from one minute to about three hours. The curing cycle is of a time-temperature nature, higher temperatures being used for shorter times and vice versa.

However, for production purposes, to eliminate transport and curing time, we prefer to cure the adhesive before the coil is removed from the winding form or winding machine by passing an electric current through the coil to produce heating throughout the entire coil. By way of example, the described adhesive on a coil formed of aluminum magnet wire having a bare wire diameter of 0.0763 inch, 1093 turns and a resistance of 9.3 ohms at 25° C., is cured in 1 to 4 minutes when connected across a 500-volt source. The cure time will vary with the consistency of the adhesive.

After curing, the coil is removed from the form. It is then a solid self-supporting structure having essentially no internal voids or gas pockets. This resulting solid structure has excellent internal heat transfer characteristics.

We next provide a shell of ground insulation 6 about the coil by coating or encapsulating the coil, preferably in a solventless liquid, although any suitable process of applying an encapsulating material, such as a fluidized bed process, may be used. This encapsulating coating is applied directly over the external conductors comprising the coil surfaces without prior application of tape or sheet insulation. The coating or encapsulation material is selected for compatibility with the magnet wire enamel so that no interaction occurs during processing or in service, for its resistance to heat and contaminants such as lubricants and vapors which will be encountered during service, and for its heat transfer capabilities. For production purposes, an additional requirement of a liquid encapsulating composition is a thixotropic characteristic which provides substantially uniform coating thicknesses, particularly at corners and edges, and further the encapsulating composition should have stabilized thixotropic properties so that the thixotropic properties will remain substantially constant over an extended period of time so that coils produced over a period of weeks will have substantially the same coating thickness.

A suitable encapsulating composition is described in our co-pending application, Serial No. 854,223, filed November 20, 1959, and assigned to the same assignee as this application. Briefly stated, this encapsulating composition comprises an epoxy resin including a thixotropy-inducing agent, a thixotropy-stabilizing material such as a polyalkylene glycol, plus fillers for providing structural strength and good heat transfer characteristics upon cure.

We have found the following composition to be particularly suitable as an encapsulating composition, since it has a useful pot life of over 100 days if its temperature is maintained at less than 80° F.:

| | Parts by weight |
|---|---|
| Araldite 6005 (resin) | 100 |
| Boron fluoride-monoethylamine | 3 |
| Silica (200 mesh) | 50 |
| Fumed silica | 4–6 |
| 1/32" milled glass fibers | 7 |
| Polyethylene glycol | 6 |

The composition is compounded as follows: The resin and boron fluoride-monoethylamine curing agent are combined by adding the curing agent to about 10 parts of the resin at about 80–90° C. until solution is achieved. This mixture is then added to the remainder of the resin and the whole milled in a three-roller mill. The remainder of the constituents are then mixed in any desired order and again milled. The composition is then deaerated.

The fumed silica is utilized as the thixotropy-inducing filler. The silica and glass fibers also aid somewhat in inducing thixotropic properties. However, the primary purpose of the silica and the fibers is to increase the structural strength upon cure. The glass fibers add to the tensile strength of the cured coating. Another important consideration in selecting a filler is the heat conductivity of the filler. The silica filler greatly enhances the heat transfer characteristics of the cured coating. Aluminum oxide is also a suitable filler, but is not as economical as silica. Other fillers may be used so long as they impart the desired properties and are compatible with the other constituents. The polyalkylene glycol stabilizes the induced thixotropic character to keep the thixotropy of the composition within a desired range so that it will provide substantially uniform coating thickness on the various coils dipped in the composition over an extended period of time, and further imparts a resiliency to the cured insulation.

The above-tabulated composition is included herein for purposes of disclosure and is not to be construed as a limiting feature of the invention.

The liquid encapsulating composition is contained in an open-top tank or vat and the self-supporting coil is dipped therein at a slow constant rate. Where a thixotropic encapsulating composition is used, the time of immersion is not critical. After immersion the encapsulated coil is raised from the encapsulating composition again at a slow constant rate.

We prefer to have the coil immersed and withdrawn slowly, or at a rate so as to avoid entrapping air bubbles in the insulating coating, to prevent introduction of air pockets into the material in the tank, to reduce drainage from the coil upon withdrawal and therefore save coating material, and to insure a coating of substantially uniform thickness about the coil. We have found that when the thixotropic coating composition described above is used, the rate of immersion and withdrawal of the coil should not be greater than about 5 inches per minute. We have found that in one coil manufacturing installation practicing our invention, the rate of immersion is preferably about 1½ inches per minute. In this installation the rate of withdrawal is slightly slower since the coil will be moved horizontally in the encapsulating material by the conveyor upon which it is suspended, as it is withdrawn. Using the stabilized thixotropic encapsulating composition described and immersing the coil at the rates indicated above, an encapsulating shell having an essentially uniform thickness of 0.031 to 0.033 inch is obtained. We have found that a coating thickness of 0.030 to 0.050 inch is satisfactory and prefer a thickness of about 0.030 inch for maximum heat dissipation. In this connection we have found that by varying the formulation of the thixotropic encapsulating composition, we can control the thickness of the coating which results from the dipping of the coil into the composition. Also, the thickness of the encapsulating shell can be maintained within close tolerances by controlling the thixotropy of the composition at a uniform level and by utilizing a slow rate of immersion and withdrawal of the coil during the encapsulation process.

When the coating is cured, or at least partially cured, the encapsulated coil is positioned about the body of the pole piece as shown in the illustration, and bonded to the pole piece.

In this step of bonding the encapsulated coil to the pole, we prefer to apply the bonding material by troweling it onto the pole and/or interior surfaces of the coil, and then mount the coil on the pole. Another preferred procedure is to place the coil on the pole and force the bonding material under pressure into the space between the pole and the coil. This procedure may be accomplished with apparatus similar to embodying the same principle of operation as the reservoir, hose, pressure source and gun used in lubricating an automobile chassis.

These bonding procedures are preferred to substantially eliminate the possibility of creating air pockets or voids in the bonding material between the winding 8 of the coil and pole body. Due to the thixotropic nature of the flowable solventless bonding resin, an essentially void-free layer of insulation 7 may be realized throughout the area between the facing surfaces of coil and pole to bond the coil and pole together and to provide a large heat transfer area.

It is of course obvious that the above-described procedure may be modified. For example, the coil may be first fitted over the pole and the bonding compound placed therebetween, and then the coil and pole dipped in the coil coating composition. In such cases, we prefer to mask the pole face 4 and surface 3 before dipping. This procedure may be preferred for smaller poles, but becomes somewhat awkward with heavier poles.

As a bonding material between the encapsulated coil and the pole, we prefer to use a flowable bonding material of putty-like consistency which is compatible with and has a similar composition to the encapsulating material referred to above. Because such a composition when cured has a higher coefficient of thermal expansion than the coil, it is desirable to modify the composition so as to reduce the differential between the coefficient of thermal expansion of the bonding layer and the encapsulated coil. This will reduce stresses which tend to cause the fracture of the bonding layer 7 during the repeated heating and cooling of the coil and pole encountered in the use. The importance of this to the retention of the heat transfer capabilities of the bonding layer is readily apparent. We have found that the differential in the thermal coefficients of expansion of the bonding composition and the encapsulated coil may be reduced by the substitution of a filler material having a low or substantially zero coefficient of thermal expansion for the silica filler utilized in the encapsulating composition referred to above. Specifically, we have found that the substitution of approximately 125 parts of 200 mesh lithium aluminum silicate, which has substantially a zero coefficient of thermal expansion, for the 50 parts of silica filler utilized in the encapsulating composition satisfactorily accomplishes this purpose. Lithium aluminum silicate is commercially available from the Foote Mineral Co. and is sold under the trademark Zerifac. In addition to the improvement in the coefficient of thermal expansion of the bonding material imparted by the use of lithium aluminum silicate, its use also increases the thermal conductivity and compressive strength of the bonding layer 7.

The quality of the bond as measured by its ability to resist fracture under operating conditions has been established by test. Ten coil assemblies similar to the Type IV coils referred to below (encapsulated coils bonded to the pole) have been tested for more than 6,000 hours, and no fractures in the coil to pole bond were noted. The test procedure involved a test cycle which has been proposed to the AIEE for adoption as a standard test procedure for Class B salient pole direct current field coils, and approximates that of AIEE test procedure No. 510 for other coil constructions. Test procedure No. 510 has been formally adopted by the AIEE. The test procedure involved in testing the ten coil assemblies referred to above involves heat agent (including temperature cycling between room temperature and 160° C.), vibration, humidity and proof high potential tests.

Comparative tests of variously constructed coil and pole assemblies illustrate the improvements resulting from the coil and the coil and pole assembly of our invention.

Four pole assemblies using poles 3⅞" long, 2¼" wide, 2.634" deep, having a shoe arc of 56°15' and an arc length of 3.38" were tested for heat dissipation characteristics. Each coil was formed of 1250 turns of magnet wire having a bare diameter of 0.0403" and having a mean turn length of 1.36'. Each coil was wound on the same standard winding form so as to have the same window dimensions.

The test procedure was as follows: A ⅟₁₆" sheetmetal box was constructed to represent a quarter of a National Electric Manufacturers' Association 284 frame size motor. Each pole surface 3 butted against and was suspended from a steel block attached to the top of the box. The block was designed to represent one-fourth of the magnet frame of a 284 motor and had dimensions of 4½" long, 2¼" wide and 2⅝" deep as related to the pole dimensions. The unrestricted volume of the internal dimensions of the box were 9½" long, 8" wide and 5½" deep. The depth was actually 8", but a platform 2½" high was placed in the bottom of the box to define with the pole shoe a simulated air gap. The box had openings of 5" diameter on opposite ends thereof to allow entrance and exit of air. A blower blew air through the box at 103 feet per minute and the calculated volumetric flow was 20 cubic feet per minute.

The coils were subjected to a constant wattage of 60 watts by applying a nominal voltage of 29 volts across the coils and increasing the voltage to maintain constant power as the resistance of the coils rose due to heating thereof. The initial voltage level was varied slightly from 29 volts as between coils to compensate for variations in cold resistance (CR) of the coils. The temperatures of the coils were measured by thermocouples inserted into the coil, and when the temperature rose to a constant value after approximately 1½ hours, the hot resistance (HR) was measured within 20 seconds after cessation of application of power. All resistance measurements were made on a Wheatstone bridge. From these measurements the temperature rise by resistance (TRR) of each coil was calculated by the formula $R_T = R_0(1+\alpha T)$ where $R_T$ is the hot resistance, $R_0$ is the cold resistance, $\alpha$ is the thermal resistivity coefficient of copper and T is the quantity solved for, the temperature rise by resistance of the coil (TRR). The heat-dissipating capacity of each coil and pole assembly was then determined by calculating the temperature rise/watts/surface area of the coil (TR/W/A). The total surface area (A) of each coil had previously been determined from coil dimensions.

The coil and core assemblies first tested were constructed as follows:

COIL I

Coil I was of conventional construction and was precision wound of magnet wire coated with a modified polyvinyl acetal enamel with glass serving thereon, commonly known as HFXG magnet wire. A solvent containing adhesive was applied to the magnet wire as it was wound. The adhesive was cured to drive out the solvent, taped with mica mat insulating tape, again taped with glass tape and dipped in an insulating material comprising unsaturated polyester resin blended with a co-reactive monomer, styrene. The insulating composition was H. H. Robertson Co. Stypol resin 602–E. The coil was wedged tightly against the pole by steel wedges.

COIL II

Coil II was made in the same manner as Coil I, except that the magnet wire was not glass served and was of the type described in the aforementioned Patent 2,936,296.

COIL III

Coil III was precision wound with "Alkanex" magnet wire coated with the solventless adhesive described above as being useful in the practice of the present invention, and dipped in the encapsulation composition described above as being useful in the practice of the present invention. The encapsulated coil was mounted on the pole by means of steel wedges inserted between coil and pole at the larger dimension in the same manner as Coils I and II.

COIL IV

Coil IV was of the construction same as Coil II except that the coil was bonded to pole using the bonding composition described above as being useful in the practice of the present invention.

The following data was obtained:

Table 1

| Coil | CR-ohms | HR-ohms | TRR-° C. | Watts | Watts/in.² | T/W/A ° C./watts/in.² |
|---|---|---|---|---|---|---|
| I | 11.87 | 14.86 | 67.0 | 60 | .564 | 119 |
| II | 11.77 | 14.29 | 55.0 | 60 | 0.66 | 83.5 |
| III | 11.89 | 14.20 | 51.0 | 60 | 0.66 | 77.4 |
| IV | 11.9 | 14.11 | 48.0 | 60 | 0.66 | 72.8 |

The heat dissipation qualities of the various coils is indicated by the calculated temperature rise per power input per area of coil (T/W/A). It may be seen by comparing the heat dissipation qualities of Coils I and II that the elimination of glass serving to provide adequate turn to turn electrical insulation illustrates the relatively inefficient internal heat transfer capabilities of coils insulated with glass serving to provide a Class B system, as compared to the use of the magnet wire of aforementioned Patent 2,936,296, and further illustrates how the use of glass fibers in an insulation system is detrimental to heat dissipation capabilities.

A comparison of the heat-dissipating qualities of Coils II and III illustrates the improvement in the heat dissipation qualities of an encapsulated coil constructed in accordance with our invention, as compared with a coil having conventional mica mat and glass tape ground insulation.

A comparison of the heat-dissipating qualities of Coils II and IV illustrates the improved heat dissipation qualities derived from bonding the coil to the pole in accordance with our invention, as compared with the more conventional wedging the coil to the pole.

Coil and pole assemblies made as described for Coils II, III and IV were also tested for heat dissipation capabilities in a 284 frame, 240 volt, 37 ampere direct current shunt motor. The motor was a General Electric Company Model 5CD284, Serial No. BS1–107. A set of four Type II coils having 1250 turns were connected in series across the armature and the motor was run at 1750 r.p.m. at no load. Air flow through the machine was 1,080 feet per minute at 1750 r.p.m. The four Type II coils were then replaced with a set of coils of each of the other types, and the tests repeated. The following data was taken and calculated following the previously outlined procedure, except that Type I coils were not tested in the motors:

Table 2

| Type coil | Watts on coils | CR-° C. | HR-° C. | TRR-° C. | T/W/A | T/W/A Improvement |
|---|---|---|---|---|---|---|
| II | 240 | 47.14 | 55.5 | 45.5 | 67.5 | 0% |
| III | 240 | 47.29 | 53.3 | 33.0 | 49.5 | 27% |
| IV | 239 | 47.29 | 52.5 | 29.0 | 43.5 | 36% |

The data presented in Table 2 bears out the results obtained in the first test as presented in Table 1. While the results of the test presented in Table 2 were taken at no load on the armature, and hence do not represent temperature rises which would be obtained under load, they do give a very good comparison of the heat-dissipating capabilities of the different insulation systems.

The T/W/A improvement as shown in Table 2 indicates the extent of the improvements resulting from the use of an encapsulated coil construction and the coil and pole assembly construction made in accordance with our invention. The significance of this improvement is indicated by the fact that coil and pole constructions similar to the Type IV coils referred to above embodying our invention with its greatly increased heat dissipation capabilities have the same ampere turn output at the maximum operating temperatures encountered in use as corresponding conventional Type I coils, but the weight of copper used in the new coils is reduced by over 36% from that which was previously used in the conventional coils.

While we have illustrated and described preferred embodiments of this invention and described modifications thereof, further changes in the disclosed embodiments may occur to those skilled in the art without departing from the spirit and scope of this invention. Accordingly, it is our intention to cover all changes and modifications of the examples of the invention herein chosen for purposes of disclosure, which do not constitute departures from the spirit and scope of the invention.

What we claim as new and desire to secure by Letters Patent of the United States is:

1. A method of manufacturing a dynamoelectric machine pole and coil assembly comprising the steps of applying a flowable solventless adhesive resinous material to an insulated magnet wire, winding the magnet wire about a form so as to cause the adhesive resinous material to fill the spaces between the wires, curing the adhesive resinous material to bond the turns of wire together and to provide a self-supporting essentially void-free coil, encapsulating the coil by immersing it slowly into a thixotropic resinous electrically insulating material, slowly removing said coil from said insulating material to provide a uniform coating thereon, at least partially curing the coating, placing the coil about the pole, filling the space defined by the facing surfaces of the coil and pole with a flowable solventless resinous material and completely curing the coating and the resinous material between the coil and the pole to provide an essentially void free bond between the pole and the coil.

2. A method of manufacturing a dynamoelectric machine pole and coil assembly comprising the steps of applying a flowable solventless adhesive resinous material to an insulated magnet wire, winding the magnet wire about a form, curing said adhesive resinous material by the application of heat to bond the turns of wire together and to provide a self-supporting coil, encapsulating the coil by immersing it into a thixotropic resinous electrically insulating material, slowly removing said coil from said insulating material to provide a uniform coating thereon, placing the coil about the pole, filling the space defined by the facing surfaces of the coil and pole with a flowable solventless resinous material to provide an essentially void-free bond between the pole and the coil.

3. A method of manufacturing a dynamoelectric machine pole and coil assembly comprising the steps of winding magnet wire to form a coil, applying a flowable solventless adhesive resinous material to said wire while it is being wound to fill the spaces between the wires, curing said adhesive resinous material by passing an electric current through the coil to bond the turns of wire together and to provide a self-supporting void-free coil, immersing said coil into a thixotropic resinous electrically insulating material, slowly removing said coil from said insulating material to provide a uniform coating thereon, placing the coil about the pole, filling the space defined by facing surfaces of the coil and pole with a second solventless resinous material to provide an essentially void-free bond between pole and coil.

4. The method of making a pole and coil assembly for a dynamoelectric machine comprising: providing insulated wire for the windings of said coil; applying a flowable, solventless, adhesive, resinous material to said insulated wire; winding said wire about a form so that the resinous material applied to said insulated wire completely fills the spaces between the turns of wire making up said coil; curing said resinous material to effect a bond between said coil turns to provide an essentially void-free insulated, self-supporting coil; encapsulating the insulated, self-supporting coil so provided with an electrically insulating, resinous composition; at least partially curing said encapsulating resinous composition; placing the encapsulated coil so provided about said pole; and intimately bonding said coil to said pole with a flowable, solventless, resinous material.

References Cited by the Examiner
UNITED STATES PATENTS

| | | | |
|---|---|---|---|
| 2,550,453 | 4/51 | Coggeshall | 310—45 |
| 2,553,362 | 5/51 | Dannenberg | 336—205 |
| 2,713,715 | 7/55 | Jenner et al. | 29—155.57 |
| 2,739,371 | 3/56 | Grisdale et al. | 29—155.57 |
| 2,743,308 | 4/56 | Bardsley | 174—52.6 |
| 2,744,204 | 5/56 | McGuiness | 310—45 |
| 2,837,669 | 6/58 | Fisher et al. | 310—45 |
| 2,846,599 | 8/58 | McAdam | 310—45 |
| 2,848,794 | 8/58 | Roth | 29—155.57 |
| 2,856,547 | 10/58 | Saums | 310—45 |
| 2,856,639 | 10/58 | Forrest et al. | 336—205 |
| 2,893,061 | 7/59 | Terry. | |
| 3,127,470 | 3/64 | Anderson et al. | 161—163 X |

MILTON O. HIRSHFIELD, *Primary Examiner.*

ORIS L. RADER, *Examiner.*